United States Patent Office 2,705,494
Patented Apr. 5, 1955

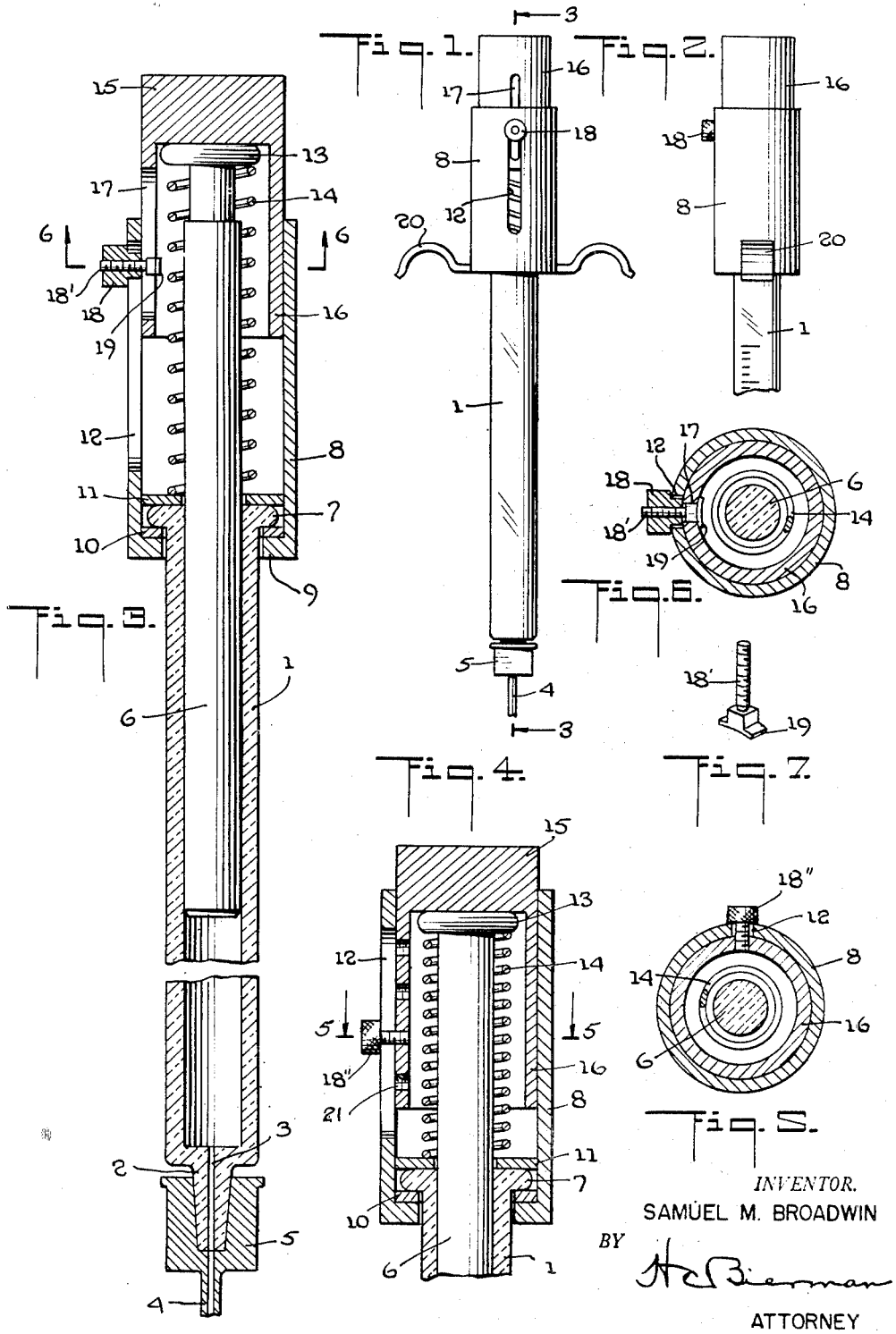

2,705,494

OPERATING DEVICE FOR SYRINGE OR PIPET

Samuel M. Broadwin, New York, N. Y., assignor to Kopp Scientific, Inc., New York, N. Y., a corporation of New York Application October 1, 1953, Serial No. 383,588

6 Claims. (Cl. 128—218)

The present invention relates to a pipet or syringe, more particularly to a means for accurately measuring successive doses of liquid ejected therefrom.

In the operation of the well-known pipet, the operator by the usual technique fills the pipet with the liquid to be measured, as by placing the tip of the pipet into the liquid, moving the plunger downwardly to expel air and then retracting the plunger to draw in the liquid. In measuring quantities of the liquid, he presses the plunger so as to force liquid through the tip and he gauges the amount of liquid by noting a scale on the glass cylinder of the instrument. This procedure involves some difficulties in that the operator must closely observe the movement of the plunger and must start and stop the movement thereof at exact positions, which is quite difficult and is usually inaccurate. Also it requires his close attention to the cylinder, whereas often it is necessary to observe the individual during the injection operation.

The present invention is intended and adapted to overcome the difficulties and disadvantages inherent in devices of the type described, it being among the objects of the present invention to provide an attachment to a pipet or the like which will accurately and automatically measure doses of liquid to be injected and to provide adjustable means for this purpose so that the device may be used for injection of various amounts of liquid.

It is also among the objects of the present invention to provide a simple structure which has a minimum of moving parts, which is substantially free from wear and which is readily adjustable for varying amounts of liquids.

It is further among the objects of the present invention to provide a device which is readily mountable upon the ordinary pipet and which may be easily dismantled for replacement of parts, such as broken glass cylinder or plunger.

In practicing the present invention there is provided a pipet with its operating parts as well known in the art, and there is attached to the upper end of the cylinder of the pipet the device of the present invention. It consists essentially of a sleeve preferably made of metal, the lower end of the sleeve having a shoulder on which the flange at the upper end of the cylinder rests. The plunger operates within the cylinder and the upper end of the plunger extends into the sleeve. A cap is provided which slides within the sleeve and the top of which is adapted to bear upon the top of the plunger. A coil spring surrounding the plunger within the sleeve acts to retract the cap and the plunger simultaneously.

The invention is more fully illustrated in the acompanying drawing constituting a part hereof, in which like reference characters indicate like parts, and in which Fig. 1 is a side elevational view of a combination of a pipet and an operating device therefor made in accordance with the present invention;

Fig. 2 is a front elevational view thereof;

Fig. 3 is an enlarged vertical cross-sectional view thereof showing the operating parts;

Fig. 4 is a fragmentary view similar to the upper portion of Fig. 3 of a modification of the invention and showing the cap in an intermediate position during the operation of the device;

Fig. 5 is a transverse cross-sectional view taken through the sleeve along line 5—5 of Fig. 4;

Fig. 6 is a transverse cross-sectional view taken along line 6—6 of Fig. 3, and

Fig. 7 is a perspective view of the screw member detached from the other elements.

The syringe or pipet consists of a cylinder or body 1 which is usually of glass. The pipet has a lower neck 2 having a fine central opening 3 at the tip. If the device is applied to a syringe, it is provided with a hypodermic needle 4 held thereon by fitting 5. A plunger 6 fitting closely within body 1 extends upwardly therefrom. The upper end of body 1 has a shoulder or flange 7.

A cylindrical sleeve 8 of greater diameter than body 1 has an inwardly extending rim 9 forming a shoulder at the lower end thereof. A soft washer 10 is interposed between shoulder 9 and flange 7 to act as a cushion and prevent breakage. A relatively hard washer 11 is fitted on top of flange 7. A longitudinal slot 12 extends along one side of sleeve 8 and terminates short of the lower end of said sleeve.

The upper end of the plunger is provided with a shoulder or flange 13 and a coil spring 14 surrounding the upper part of the plunger has its upper end bearing against the under side of flange 13 and its lower end bearing against washer 11.

A cap 15 has depending cylindrical sides 16 which fit relatively closely on the inner face of sleeve 8. A slot 17 on side 16 is in vertical alinement and in register with slot 12, which is wider than slot 17. A flared nut 18 threads onto the stem of bolt 18', which has an elongated arcuate head 19, adapted to bear against the inner face of side 16 of cap 15. Said head is usually rectangular and fits closely in slot 17, so that it does not rotate therein.

In the operation of the device the assembly is made as seen in Fig. 3 with liquid filling the lower part of body 1 up to the lower end of plunger 6. Nut 18 is in the position shown and pressure is applied to cap 15 by the thumb of the operator, whose forefinger and middle finger embrace finger holds 20 at the lower end of sleeve 8. The operator presses cap 15, causing ejection of liquid through tip 3 until nut 18 contacts the bottom of slot 12. Then the operator releases cap 15 and the plunger is retracted to its initial position. If a different amount is required, nut 18 is loosened, bolt 18' is shifted along slots 12 and 17, and the nut is tightened at the desired point.

Referring to the modification shown in Figs. 4 and 5, the structure is quite similar to that shown in Fig. 1 except that slot 17 is omitted. In place thereof a series of vertically alined threaded openings 21 are provided, which openings are in register with slot 12. A screw 18" is adapted to be inserted in any one of said openings.

I claim:

1. A pipet or syringe comprising a cylindrical hollow body, a plunger adapted to slide therein and extending from one end thereof, a sleeve at said end, the lower part of said sleeve being secured to said end of said body and the extending portion of said plunger being within said sleeve, a cap slidably mounted in said sleeve, the top of said cap being in contact with the top of said plunger, a spring surrounding said plunger within said sleeve and cap, a longitudinal slot in said sleeve, that portion of said cap in register with said slot having a vertical slot, and means passing through said slots, whereby adjustment of the length of travel of said cap is obtained.

2. A pipet or syringe comprising a cylindrical hollow body, a plunger adapted to slide therein and extending from one end thereof, a sleeve at said end, the lower part of said sleeve being secured to said end of said body and the extending portion of said plunger being within said sleeve, a cap slidably mounted in said sleeve, the top of said cap being in contact with the top of said plunger, a spring surrounding said plunger within said sleeve and cap, a longitudinal slot in said sleeve, that portion of said cap in register with said slot having a vertical slot, and means passing through said slots, whereby adjustment of the length of travel of said cap is obtained, and a pair of oppositely extending finger-holds at the lower end of said sleeve.

3. A pipet or syringe comprising a cylindrical hollow body, a plunger adapted to slide therein and extending from one end thereof, a sleeve at said end, the lower part of said sleeve being secured to said end of said body and the extending portion of said plunger being within said sleeve, a cap slidably mounted in said sleeve, the top of said cap being in contact with the top of said plunger, a spring surrounding said plunger within said sleeve and cap, a flange on said end of said cylinder, one end of said spring bearing on said flange, a longitudinal slot in said sleeve, that portion of said cap in register with said slot having a vertical slot, and means passing through said slots whereby adjustment of the length of travel of said cap is obtained.

4. A pipet or syringe comprising a cylindrical hollow body, a plunger adapted to slide therein and extending from one end thereof, a sleeve at said end, the lower part of said sleeve being secured to said end of said body and the extending portion of said plunger being within said sleeve, a cap slidably mounted in said sleeve, the top of said cap being in contact with the top of said plunger, a spring surrounding said plunger within said sleeve and cap, a flange on said end of said cylinder, one end of said spring bearing on said flange, a flat top on said plunger, the opposite end of said spring bearing on said flat top, a longitudinal slot in said sleeve, that portion of said cap in register with said slot having a vertical slot and means passing through said slots whereby adjustment of the length of travel of said cap is obtained.

5. A pipet or syringe comprising a cylindrical hollow body, a plunger adapted to slide therein and extending from one end thereof, a sleeve at said end, the lower part of said sleeve being secured to said end of said body and the extending portion of said plunger being within said sleeve, a cap slidably mounted in said sleeve, the top of said cap being in contact with the top of said plunger, a spring surrounding said plunger within said sleeve and cap, a flange on said end of said cylinder, one end of said spring bearing on said flange, a shoulder on the lower end of said sleeve, said flange bearing on said shoulder, a longitudinal slot in said sleeve, that portion of said cap in register with said slot having a vertical slot, and means passing through said slots whereby adjustment of the length of travel of said cap is obtained.

6. A pipet or syringe comprising a cylindrical hollow body, a plunger adapted to slide therein and extending from one end thereof, a sleeve at said end, the lower part of said sleeve being secured to said end of said body and the extending portion of said plunger being within said sleeve, a cap slidably mounted in said sleeve, the top of said cap being in contact with the top of said plunger, a spring surrounding said plunger within said sleeve and cap, a flange on said end of said cylinder, one end of said spring bearing on said flange, a shoulder on the lower end of said sleeve, said flange bearing on said shoulder, washers contacting the upper and lower faces of said flange, a longitudinal slot in said sleeve, that portion of said cap in register with said slot having a vertical slot, and means passing through said slots whereby adjustment of the length of travel of said cap is obtained.

References Cited in the file of this patent

UNITED STATES PATENTS

| | | |
|---|---|---|
| 159,192 | Leiter | Jan. 26, 1875 |
| 1,608,275 | Grier et al. | Nov. 23, 1926 |